United States Patent
Takahashi et al.

(10) Patent No.: US 10,597,805 B2
(45) Date of Patent: Mar. 24, 2020

(54) KNITTED FABRIC AND METHOD FOR KNITTING SAME

(71) Applicants: Newknit Co., Ltd., Fukui (JP); Toray Industries, Inc., Tokyo (JP)

(72) Inventors: Kazaru Takahashi, Fukui (JP); Satoshi Naruko, Shiga (JP); Masashi Chikada, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 164 days.

(21) Appl. No.: 15/735,757

(22) PCT Filed: Jun. 29, 2016

(86) PCT No.: PCT/JP2016/069303
§ 371 (c)(1),
(2) Date: Dec. 12, 2017

(87) PCT Pub. No.: WO2017/002867
PCT Pub. Date: Jan. 5, 2017

(65) Prior Publication Data
US 2018/0179676 A1 Jun. 28, 2018

(30) Foreign Application Priority Data

Jul. 2, 2015 (JP) ................. 2015-133530
May 31, 2016 (JP) ................. 2016-108624

(51) Int. Cl.
*D04B 21/10* (2006.01)
*D04B 21/06* (2006.01)
(Continued)

(52) U.S. Cl.
CPC ............. *D04B 21/10* (2013.01); *D04B 21/06* (2013.01); *D04B 21/08* (2013.01); *D04B 21/12* (2013.01);
(Continued)

(58) Field of Classification Search
CPC ........ D04B 21/02; D04B 21/04; D04B 21/06; D04B 21/08; D04B 23/08; D04B 21/10
See application file for complete search history.

(56) References Cited

U.S. PATENT DOCUMENTS 5,385,036 A * 1/1995 Spillane .................. A43B 1/04
2/16
5,807,295 A * 9/1998 Hutcheon ................. A61F 5/01
602/42

(Continued)

FOREIGN PATENT DOCUMENTS

CN 102534977 A 7/2012
DE 20319433 U1 8/2004

(Continued)

OTHER PUBLICATIONS

Search Report for related European Application No. EP 16817975. 2; report dated Jan. 1, 2019.

*Primary Examiner* — Danny Worrell
(74) *Attorney, Agent, or Firm* — Miller, Matthias & Hull LLP

(57) ABSTRACT

The present invention relates to a knitted fabric which can be produced at low cost and can exhibit a stable color effect, and a method of knitting such a fabric. A warp-knitted fabric (1) consists of a base (2) and ridge portions (6) formed along a knitting direction, each ridge portion (6) is composed of a top portion (3) and two side wall portions (4, 5) respectively formed at both sides of the top portion (3), and the top portion (3) and the side wall portions (4, 5) are respectively formed by chain-stitch rows formed by knitting yarns having different colors from one another. The warp-knitted fabric (1) exhibits a color effect such that the color thereof visually recognized by an observer who looks at the warp-knitted (Continued)

fabric (1) from a direction intersecting the knitting direction is changed in accordance with the position of the observer.

14 Claims, 7 Drawing Sheets

(51) Int. Cl.
  *D04B 21/08* (2006.01)
  *D04B 21/12* (2006.01)
(52) U.S. Cl.
  CPC .. *D10B 2403/02* (2013.01); *D10B 2403/0213* (2013.01); *Y02P 70/633* (2015.11)

(56) References Cited

U.S. PATENT DOCUMENTS

| | | | | |
|---|---|---|---|---|
| 6,105,401 | A * | 8/2000 | Chadeyron | D04B 1/22 66/195 |
| 6,758,068 | B2 * | 7/2004 | Shirasaki | D04B 21/16 66/170 |
| 7,076,974 | B1 * | 7/2006 | Chen | D04B 21/10 66/195 |
| 7,174,750 | B2 * | 2/2007 | Shirasaki | D04B 21/16 66/195 |
| 7,213,421 | B2 * | 5/2007 | Shirasaki | D04B 21/14 66/193 |
| 7,235,504 | B2 * | 6/2007 | Shirasaki | A47C 31/006 442/304 |
| 7,565,821 | B2 * | 7/2009 | Park | B60N 2/976 66/195 |
| 7,913,520 | B1 * | 3/2011 | Chen | D04B 1/16 66/195 |
| 8,448,475 | B2 * | 5/2013 | Akao | D04B 21/16 66/193 |
| 2002/0157429 | A1 | 10/2002 | Matsumoto | |
| 2004/0142619 | A1 | 7/2004 | Ueno et al. | |

FOREIGN PATENT DOCUMENTS

| | | |
|---|---|---|
| JP | S61239064 A | 10/1986 |
| JP | S62033341 | 7/1987 |
| JP | 2003041465 A | 2/2003 |
| JP | 2013124419 A | 6/2013 |
| WO | 0250352 A1 | 6/2002 |

\* cited by examiner

KNITTED FABRIC AND METHOD FOR KNITTING SAME

TECHNICAL FIELD

The present invention relates to a knitted fabric having ridge portions formed thereon along a knitting direction and a method of knitting such a fabric. More particularly, the present invention relates to a knitted fabric knitted so that the color of the knitted fabric which is visually recognized by an observer who looks at the knitted fabric from a direction intersecting the knitting direction is changed in accordance with the position of the observer, and a method of knitting such a fabric.

BACKGROUND ART

In recent years, more and more consumers desire more high-fashion clothes, bags, and shoes and, in order to meet such consumers' desires, a knitted fabric to allow clothes or the like to have an excellent, beautiful appearance or liveness has been actively developed. Typically, such a knitted fabric is provided with a color effect which is produced by a method such as using a plurality of yarns having different colors or made of different materials, combining structures, or using a mesh design or the like, and clothes or the like using such a knitted fabric exhibit an excellent, beautiful appearance or liveness caused by the color effect provided on the knitted fabric.

As for such a knitted fabric provided with a color effect, for example, a knitted fabric provided with a color effect called "iridescence" (Japanese Unexamined Patent Application Publication No. 2003-41465) and a knitted or woven fabric provided with a color effect which is produced by decorating the surface of the fabric with an uneven pattern (Japanese Unexamined Patent Application Publication No. 2013-124419) have been proposed.

The conventional knitted fabric disclosed in Japanese Unexamined Patent Application Publication No. 2003-41465 is produced by knitting a fabric with yarns which can be dyed in different colors by dyeing alternately using different dying methods or different dyes, and then dying the knitted fabric by alternately using the different dying methods or different dyes so that the portions dyed by the different methods appear on the surface of the knitted fabric with an almost equal area. Because of having the portions dyed by the different methods with an equal area, the knitted fabric exhibits an iridescent color effect.

The conventional knitted or woven fabric disclosed in Japanese Unexamined Patent Application Publication No. 2013-124419 is a composite fabric composed of an upper fabric and a lower fabric, and has a single-layer structure portion and a double-layer hollow structure portion formed alternately thereon, the upper fabric and the lower fabric being combined together at the single-layer structure portion, and the upper fabric and the lower fabric being separated from each other at the double-layer hollow structure portion. The double-layer hollow structure portion in the lower fabric uses a heat-shrinkable fiber yarn, and, in producing the knitted or woven fabric, the double-layer hollow structure portion in the lower fabric is shrunk by thermal processing and thereby the double-layer hollow structure portion in the upper fabric is raised to form a ridge, whereby the surface of the knitted or woven fabric is decorated with an uneven pattern. In this knitted or woven fabric, yarns of different colors are arranged in right and left surfaces that constitute the ridge of the upper fabric so that the observer can visually recognize different colors between when looking at the knitted or woven fabric from one surface side and when looking at the knitted or woven fabric from the other surface side, which exhibits a color effect.

As described above, both of the above-described conventional arts provide a knitted fabric with a color effect. Therefore, clothes or the like using such a knitted fabric can exhibit an extraordinary, beautiful appearance or liveness because the knitted fabric looks different when the position of the observer relative to the knitted fabric is changed by a motion of the wearer.

CITATION LIST

Patent Literature

Patent Literature 1: Japanese Unexamined Patent Application Publication No. 2003-41465
Patent Literature 2: Japanese Unexamined Patent Application Publication No. 2013-124419

SUMMARY OF INVENTION

Technical Problem

By the way, in order to obtain a color effect, the above-described conventional knitted fabric requires performing at least two dyeing steps after the fabric is knitted. Therefore, the production process for the knitted fabric is complex and takes much time, which increases the production cost. Further, the knitting yarns to be used for the knitted fabric have to be able to be dyed in different colors; therefore, there is a problem that the knitting yarns are limited in kind.

Further, performing different dyeing steps necessarily increases the amount of dye liquids to be used therefor; therefore, the disposal of waste liquids is costly. Further, there is also a problem that a heavy burden is imposed on the environment.

On the other hand, the above-described conventional knitted or woven fabric has the ridges that are the double-layer hollow structure portions in the upper fabric raised by heat shrinkage of the double-layer hollow structure portions in the lower fabric. These ridges cannot be freely controlled in shape, and therefore the ridges are non-uniform in shape. Accordingly, for example, if the top portions of the ridges are different in position, on some ridges, right and left surfaces thereof have different colors arranged thereon, whereas on other ridges, a color supposed to be arranged only on one surface thereof is arranged on a part of the other surface thereof. Therefore, there is a problem that, when the fabric is looked at from the other surface side, it lacks uniformity because the color supposed to be arranged on the one surface is visually recognized on a part of the other surface, and it is therefore difficult to obtain a sufficient color effect.

Further, the ridges merely result from parts of the upper fabric being raised; therefore, it cannot be said that the ridges per se have high shape stability. Therefore, the ridges are easily transformed in shape when an external force is applied thereto. Accordingly, if this knitted or woven fabric is used for clothes or the like, there is a problem that the ridges are transformed in shape when an external force is applied thereto by a motion of the wearer, and therefore the clothes or the like have trouble exhibiting an expected color effect.

As described above, the conventional knitted or woven fabric has the problem that it is difficult to exhibit a color effect; therefore, even if it is used for clothes or the like, the clothes or the like are not necessarily provided with a sufficient beauty or liveness.

The present invention has been achieved in view of the above-described circumstances, and an object thereof is to provide a knitted fabric which does not particularly require knitting yarns to be used therefor to be limited in kind, can be produced at low cost, and can exhibit a stable color effect, and a method of knitting such a fabric.

Solution to Problem

The present invention, for solving the above-described problems, relates to a knitted fabric having a base and a plurality of ridge portions formed in parallel to each other along a knitting direction on the base, the ridge portions each including a top portion and two side wall portions, the top portion being formed by a stitch row extending along the knitting direction, the two side wall portions each being formed by a stitch row extending in the knitting direction and knitted such that it is knitted in the base at the base side thereof and engaged with the top portion at the top portion side thereof to couple the top portion to the base, at least one of the top and two side wall portions having a different color arranged thereon from the others of the top portion and two side wall portions.

On the above knitted fabric, because at least one of the top portion and two side wall portions constituting each ridge portion has a different color arranged thereon from the others of them, a color effect such that the color of the knitted fabric which is visually recognized by an observer who looks at the knitted fabric from a direction intersecting the knitting direction is changed in accordance with the position of the observer is exhibited.

For example, in a case the top portion has arranged thereon a color different from a color arranged on the two side wall portions, when the surface of the knitted fabric is looked at from the front side, the color arranged on the top portion is visually recognized, whereas when the knitted fabric is looked at from the direction intersecting the knitting direction, the color arranged on the top portion as well as the color arranged on the two side wall portions are visually recognized.

Further, in a case where the top portion and one of the side wall portions have arranged thereon a color different from a color arranged on the other of the side wall portions, when the knitted fabric is looked at from the one side wall portion side, the color arranged on the top portion and the one side wall portion is visually recognized, whereas when the knitted fabric is looked at from the other side wall portion side, the color arranged on the other side wall portion is visually recognized.

Furthermore, in a case where the top portion and the two side wall portions have different colors arranged thereon from one another, when the surface of the knitted fabric is looked at from the front side, the color arranged on the top portion is visually recognized. When the knitted fabric is looked at from one side wall portion side, the color arranged on the top portion as well as the color arranged on the one side wall portion are visually recognized, whereas when the knitted fabric is looked at from the other side wall portion side, the color arranged on the top portion as well as the color arranged on the other side wall portion are visually recognized.

Thus, this knitted fabric exhibits a color effect such that the color of the knitted fabric which is visually recognized by an observer who looks at the knitted fabric is changed in accordance with the position of the observer.

Further, in the knitted fabric according to the present invention, because the side wall portions are knitted in the base and engaged with the top portion, the ridge portion per se has high shape stability and it is less likely to be transformed in shape even when an external force is applied thereto. Therefore, the degree of the color effect of the knitted fabric is less likely to be influenced by the manner of use, and therefore the color effect can be sufficiently exhibited.

Note that, in the above knitted fabric, it is preferred that the top portion is formed by at least two chain-stitch rows coupled to each other by a coupling yarn, each of the two side wall portions is formed by a chain-stitch row, and the chain-stitch rows of the side wall portions are engaged with the top portion in a state where loops formed on the top portion sides thereof are inserted in the chain-stitch rows of the top portion.

In this case, the knitted fabric can be preferably knitted by a fabric knitting method which uses a knitting machine to knit a knitted fabric having a base and a plurality of ridge portions formed in parallel to each other along a knitting direction on the base, the ridge portions each including a top portion and two side wall portions coupling the top portion to the base, the knitting machine including at least one pair of needle beds having a plurality of knitting needles and facing each other, and a feed mechanism feeding a knitting yarn to the knitting needles, the method including:

while causing the feed mechanism to feed at least one of knitting needles corresponding to the top portion and the two side wall portions with a knitting yarn of a color different from a color of a knitting yarn to be fed to the others of the knitting needles;

on one of the pair of needle beds, knitting at least two chain-stitch rows and coupling the chain-stitch rows to each other with a coupling yarn to form the top portion; and on the other of the pair of needle beds, knitting chain-stitch rows such that loops inserted in the chain-stitch rows constituting the top portion are formed on sides thereof facing the one of the pair of needle beds to form the two side wall portions coupled to the top portion, and forming the base coupled to the two side wall portions.

With this knitting method, the base and the ridge portions can be formed by knitting chain-stitch rows at the time of knitting. Therefore, as compared with a case where ridges are formed by performing a certain process after knitting as in the conventional method, the ridge portions are less likely to be non-uniform in shape, and therefore the problem that the color effect is not sufficiently exhibited due to non-uniformity in shape of the ridge portions can be solved. Further, this method does not require a dyeing step after knitting, and therefore an increase in cost can be suppressed.

Note that, as long as at least one of the top portion and two side wall portions is able to have a different color from the others of them as mentioned above, the knitting yarns to be used therefor are not particularly limited in kind and can be freely selected for use from filament yarns and spun yarns.

Further, in the above knitted fabric, the coupling yarn may be extended between a part of the top portion of each ridge portion and parts of the top portions of other ridge portions adjacent thereto to form a mesh portion. In this case, because each ridge portion is coupled to other ridge portions adjacent thereto by the mesh portion, the ridge portions can have more improved shape stability. Further, the mesh portion being formed causes the ridge portions to be visually recognized through openings of the mesh portion; therefore, as compared with the case where no mesh portion is formed, it is possible to express a complicated pattern.

Furthermore, the above knitted fabric may have formed thereon a knitted area having at least one cut (opening), the knitted area being knitted to couple a part of the top portion of each ridge portion to parts of the top portions of other ridge portions adjacent thereto. Also in this case, similarly to the above case, because the ridge portions are coupled to each other by the knitted area, the ridge portions can have improved shape stability and the color effect can be stably exhibited. Further, because the ridge portions are visually recognized through the cut, as compared with the case where no knitted area is formed, the knitted fabric can show a complicated pattern on the surface thereof.

Further, the base may have at least one stitch row formed therein between each ridge portion and other ridge portions adjacent thereto. In this case, each ridge portion is spaced apart from the ridge portions adjacent thereto, and therefore the space between the ridge portions is made wider. Therefore, the ranges of the position of the observer which allow the side wall portions to be visually recognized are changed, which allows the color effect to be exhibited differently from the case where the space between the ridge portions is narrow. Note that making the space between the ridge portions excessively wide could make the ranges of the position of the observer which allow the side wall portions to be visually recognized too small to sufficiently exhibit the color effect, or could cause the base to be visually recognized so much that the beautiful appearance of the knitted fabric is impaired. Accordingly, it is preferred that the number of stitch rows to be formed is adjusted so that the space between the ridge portions is approximately 1.5 mm to 4 mm (which is equivalent to approximately 3 to 5 knitting needles).

Note that the base may be formed in a mesh pattern and may use a transparent yarn for the knitting yarn therefor. Forming the base in a mesh pattern enables reduction of the weight of the knitted fabric and, when such a knitted fabric is used for clothes or the like, the clothes or the like can have high air permeability. Further, using a transparent yarn for the knitting yarn for the base makes the base inconspicuous and accentuates the colors of the ridge portions, which enhances the color effect produced by arranging different colors on the top portion and two side wall portions constituting the ridge portion.

Advantageous Effects of Invention

As described above, the knitted fabric according to the present invention does not particularly require the knitting yarns to be used therefor to be limited in kind, reduces production costs, and nevertheless can stably exhibit an enhanced color effect. When this knitted fabric is used for clothes or the like, the knitted fabric can provide the clothes or the like with an extremely excellent, beautiful appearance or liveness.

Further, with the fabric knitting method according to the present invention, it is possible to make the ridge portions less likely to be non-uniform in shape; therefore, it is possible to knit a fabric which sufficiently exhibits a color effect.

DESCRIPTION OF EMBODIMENTS

Hereinafter, specific embodiments of the present invention will be described with reference to the drawings.

First Embodiment

Figure 1:
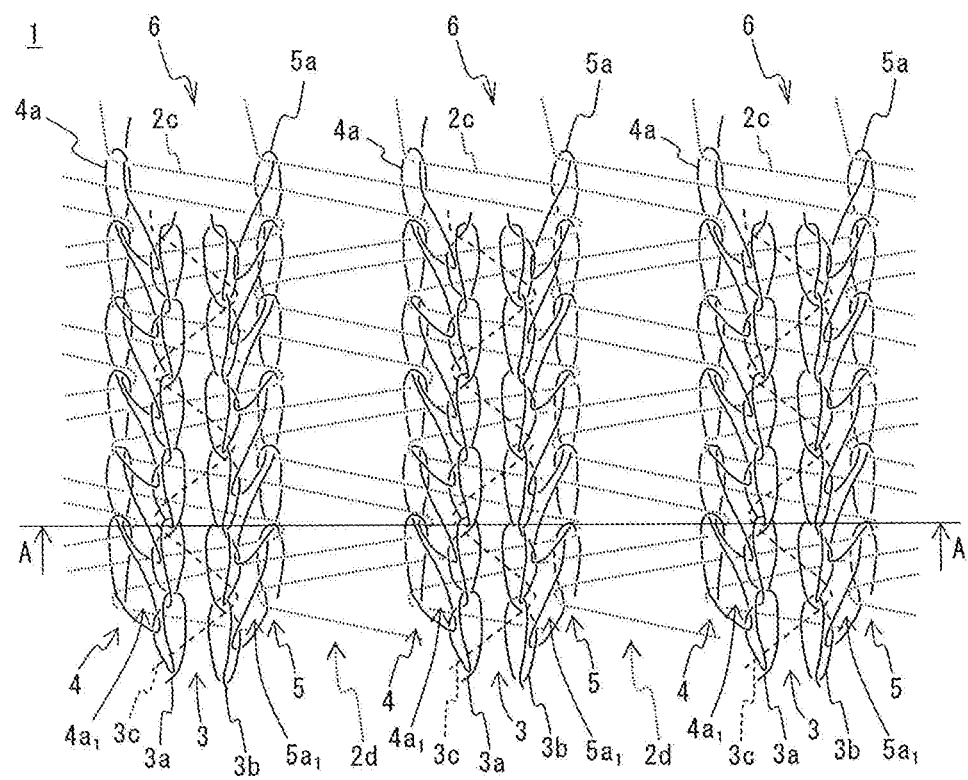
FIG. 1 shows details of a structure of a warp-knitted fabric according to a first embodiment.
Figure 2:
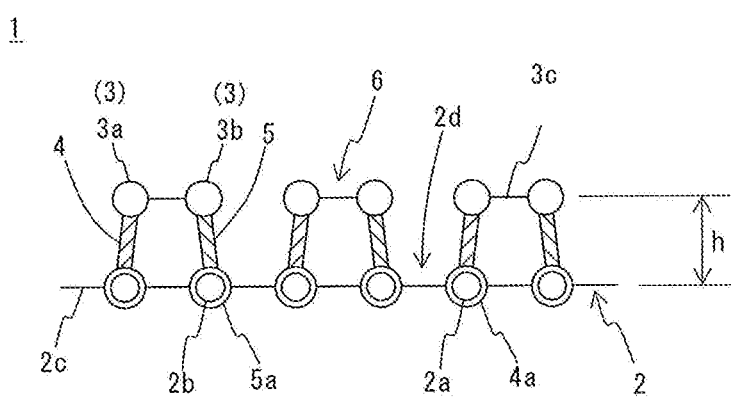
FIG. 2 is a sectional view taken along the line A-A in FIG. 1.

FIG. 1 shows details of a structure of a warp-knitted fabric 1 according to a first embodiment, and FIG. 2 is a sectional view taken along the line A-A in FIG. 1. As shown in FIGS. 1 and 2, the warp-knitted fabric 1 consists of a base 2 and ridge portions 6 formed along a knitting direction, each ridge portion 6 being composed of a top portion 3 and two side wall portions 4, 5 respectively formed at both sides of the top portion 3.

The top portion 3 is formed by two chain-stitch rows $3a$, $3b$ coupled to each other by a coupling yarn $3c$, and the side wall portions 4, 5 are formed by chain-stitch rows $4a$, $5a$ having loops $4a_1$, $5a_1$, which are described later, engaged with the two chain-stitch rows $3a$, $3b$, respectively. The base 2 is composed of chain-stitch rows $2a$, $2b$ and coupling portions $2d$ formed between the ridge portions 6, the chain-stitch rows $2a$, $2b$ respectively having the chain-stitch rows $4a$, $5a$ of the side wall portions 4, 5 connected thereto, and each coupling portion $2d$ being formed by a coupling yarn $2c$ coupling the chain-stitch rows $2a$, $2b$ to each other. Note that, in FIG. 1, the chain-stitch rows $3a$, $3b$ constituting the top portion 3 and the chain stitch rows $4a$, $5a$ constituting the side wall portions 4, 5 are indicated by solid lines, the coupling yarn $3c$ of the top portion 3 is indicated by broken lines, the coupling yarn $2c$ of the base 2 is indicated by dotted lines, and illustration of the chain-stitch rows $2a$, $2b$ of the base 2 is omitted.

Further, in the warp-knitted fabric 1 according to this embodiment, a knitting yarn of a first color is used for the two chain-stitch rows $3a$, $3b$ constituting the top portion 3, a knitting yarn of a second color is used for the chain-stitch row $4a$ constituting the side wall portion 4, a knitting yarn of a third color is used for the chain-stitch row $5a$ constituting the side wall portion 5, and a transparent knitting yarn is used for the chain-stitch rows $2a$, $2b$ constituting the base 2 and the coupling yarns $2c$, $3c$. Note that the chain-stitch rows $2a$, $2b$ constituting the base 2 may respectively use colored yarns of the same colors as those of the chain-stitch rows $4a$, $5a$ of the side wall portions 4, 5 connected thereto, and the coupling yarn $3c$ of the top portion 3 may use a colored yarn of the same color as that of the chain-stitch rows $3a$, $3b$ constituting the top portion 3.

Note that examples of the knitting yarns used for the chain-stitch rows $2a$, $2b$ of the base 2, chain-stitch rows $3a$, $3b$ and coupling yarns $3c$ of the top portions 3, and chain-stitch rows $4a$, $5a$ of the side wall portions 4, 5 in this embodiment include filament yarns, such as a polyester yarn, a nylon yarn, a rayon yarn, and the like, as well as spun yarns. Further, examples of the coupling yarn $2c$ of the base 2 include mono-filament yarns with high transparency made of polyester, thermoplastic elastomer, nylon, or the like.

This warp-knitted fabric 1 can be knitted by using a well-known double raschel knitting machine including two needle beds having a plurality of knitting needles and oppositely arranged, and a feed mechanism feeding predetermined yarns to the needle beds.

Specifically, on one of the needle beds (front-side needle bed), the top portion 3 is formed by knitting the two chain-stitch rows $3a$, $3b$ with the knitting yarn of the first color that is fed by the feed mechanism, and simultaneously coupling the two chain-stitch rows $3a$, $3b$ that are adjacent to each other in a wale direction to each other with the coupling yarn $3c$.

On the other hand, on the other of the needle beds (rear-side needle bed), the two chain-stitch rows $4a$, $5a$ constituting the side wall portions 4, 5 are respectively knitted with the knitting yarns of the second and third colors that are fed by the feed mechanism, and the chain-stitch rows $2a$, $2b$ constituting the base 2 are knitted with a transparent knitting yarn that is fed by the feed mechanism, and simultaneously the chain-stitch rows $2a$, $2b$ are coupled to other chain-stitch rows $2a$, $2b$ located near them with a plurality of coupling yarns $2c$, along the wale direction.

In the knitted fabric according to this embodiment, when the chain-stitch rows $4a$, $5a$ of the side wall portions 4, 5 are knitted, the loops $4a_1$, $5a_1$ are formed on the sides facing the chain-stitch rows of the top portion 3 (sides facing the front-side needle bed) of the chain-stitch rows $4a$, $5a$, and the loops $4a_1$, $5a_1$ are inserted into stitches of the chain-stitch rows $3a$, $3b$ of the top portion 3, whereby the chain-stitch rows $4a$, $5a$ of the side wall portions 4, 5 are engaged with the chain-stitch rows $3a$, $3b$ of the top portion 3. Meanwhile, the chain-stitch rows $4a$, $5a$ of the side wall portions 4, 5 are knitted into the chain-stitch rows $2a$, $2b$ of the base 2, whereby the chain-stitch rows $4a$, $5a$ of the side wall portions 4, 5 are connected to the chain-stitch rows $2a$, $2b$ of the base 2, respectively.

Thus, the top portion 3 is coupled to the base 2 by the side wall portions 4, 5, whereby a three-dimensional warp-knitted fabric is knitted in which the ridge portions 6 each composed of the top portion 3 and the side wall portions 4, 5 are formed on the base 2.

In the thus-knitted wrap-knitted fabric 1, because the base 2 and the ridge portions 6 are formed at the time of knitting, the ridge portions 6 are less likely to be non-uniform in shape and the ridge portions 6 are therefore almost uniform in shape. Further, each ridge portion 6 is composed of the top portion 3 and the side wall portions 4, 5, which are each formed by a chain-stitch row, and the chain-stitch rows $4a$, $5a$ constituting the side wall portions 4, 5 are engaged with the chain-stitch rows $3a$, $3b$ of the top portion 3 and knitted in the chain-stitch rows $2a$, $2b$ of the base 2. Therefore, the ridge portions 6 have higher shape stability than the conventional ones.

Note that the height h from the base 2 to the top portion 3 depends on the distance between the oppositely arranged two needle beds in the double raschel knitting machine and the elasticities of the knitting yarns. However, when the height h is higher, the shape of the ridge portions 6 is more breakable. Therefore, it is preferred that the distance between the needle beds is changed or a tension or the like during knitting is adjusted so that the height h is approximately 1 mm to 4 mm.

Next, a color effect produced by the warp-knitted fabric 1 is described below with reference to FIG. 3.

The color of the warp-knitted fabric 1 visually recognized by an observer who looks at the warp-knitted fabric 1 from a direction intersecting the knitting direction is changed in accordance with the position of the observer. Specifically, when the observer looks at the warp-knitted fabric 1 from the inside of the region R1 that is located on the left side of the sheet in FIG. 3, the top portion 3 as well as the side wall portion 4 are visually recognized by the observer; therefore, the observer can visually recognize the first and second colors. Meanwhile, the side wall portion 5 is located in the observer's blind spot; therefore, the third color is not visually recognized by the observer.

Figure 3:
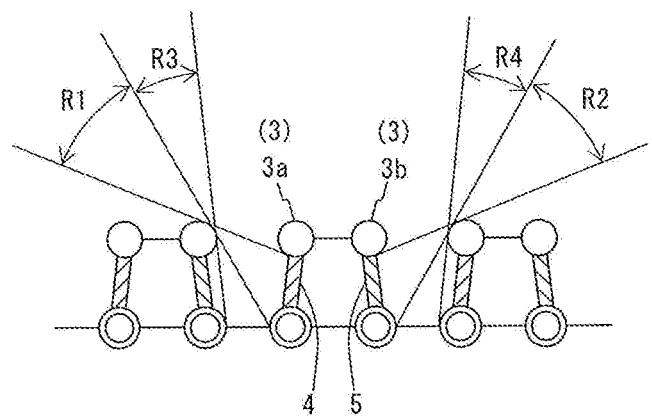
FIG. 3 is an illustration for explaining a color effect of the warp-knitted fabric according to the first embodiment.

In contrast, when the observer looks at the warp-knitted fabric 1 from the inside of the region R2 that is located on the right side of the sheet in FIG. 3, the top portion 3 as well as the side wall portion 5 are visually recognized by the observer; therefore, the observer can visually recognize the first and third colors. Meanwhile, the side wall portion 4 is located in the observer's blind spot; therefore, the second color is not visually recognized by the observer. Note that, in this embodiment, the angles of the region R1 and region R2 are approximately 40° to 60°.

The region 3 and the region 4 in FIG. 3 accompany the region R1 and the region R2, respectively. For example, the region R3 and the region R4 complement a duration in which the position of the observer changes from the inside of the region R1 to the inside of the region R2, that is, transition from the state where the observer visually recognizes the first and second colors to the state where the observer mainly visually recognizes the first and third colors, thereby effectively serving to produce an elegant color effect.

As described above, the warp-knitted fabric 1 according to this embodiment produces a color effect such that the color of the warp-knitted fabric 1 visually recognized by an observer who looks at the warp-knitted fabric 1 is changed in accordance with the position of the observer. When this warp-knitted fabric 1 is used for clothes, a bag, shoes, or the like, the color effect is exhibited by a change of the position of the observer relative to the surface of the warp-knitted fabric 1 caused by a motion of the wearer; which allows the clothes or the like to have an excellent beautiful appearance or liveness. Note that, because the coupling yarn $2c$ uses a transparent knitting yarn, the colors of the ridge portions 6 are more conspicuous than in a case where the coupling yarn $2c$ uses a colored yarn.

Further, on the warp-knitted fabric 1, because the ridge portions 6 are much less likely to be non-uniform in shape as described above, the color effect is stably exhibited as compared with the conventional knitted fabrics. Further, because the ridge portions 6 have high shape stability, the color effect is stably exhibited even when the warp-knitted fabric 1 is used for clothes or the like and an external force is applied thereto due to a motion of the wearer.

Second Embodiment

Next, a warp-knitted fabric 11 according to a second embodiment of the present invention is described with reference to FIGS. 4 and 5. Note that FIG. 4 omits illustration of the chain-stitch rows $2a$, $2b$ of the base 2, and FIG.

Figure 4:
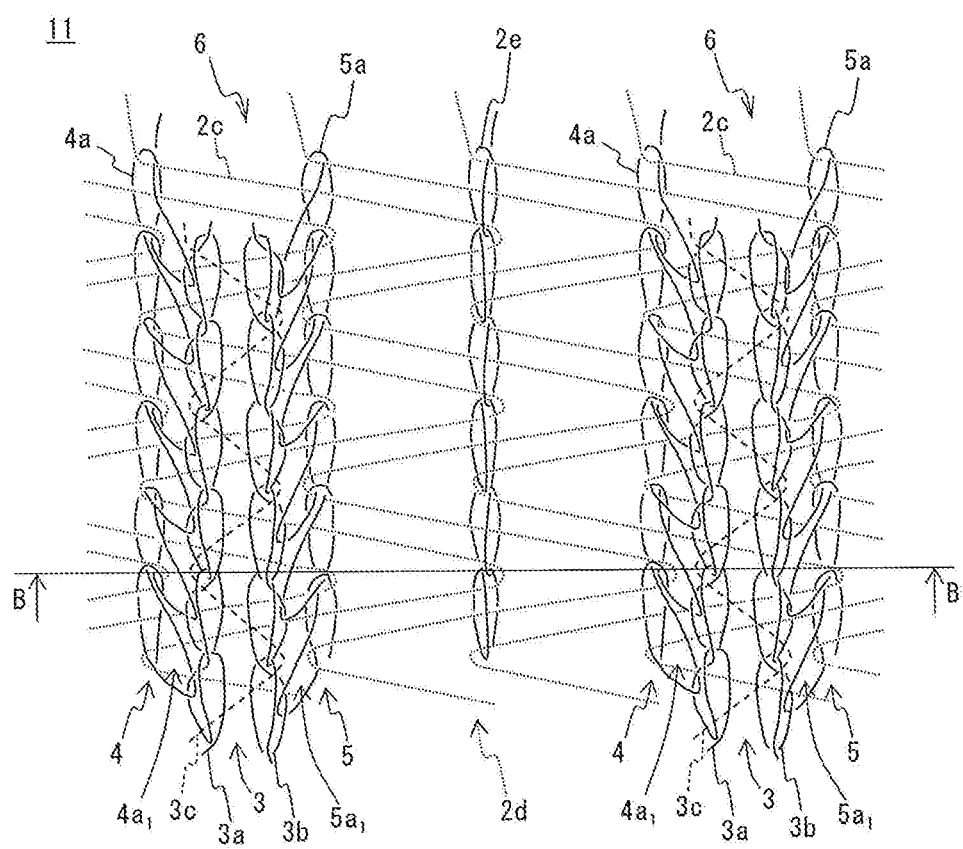
FIG. 4 shows details of a structure of a warp-knitted fabric according to a second embodiment.

5 illustrates a total of three ridge portions by illustrating a ridge portion which is not illustrated in FIG. 4. Further, in the following description, the same components as those of the warp-knitted fabric 1 are denoted by the same reference signs and detailed description thereof is omitted.

Figure 5:
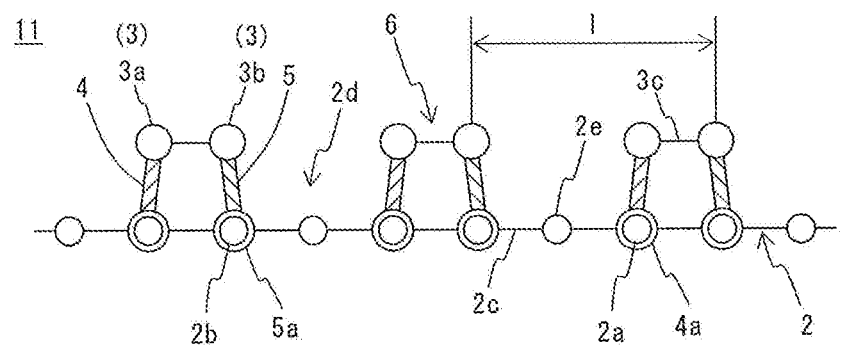
FIG. 5 is a sectional view taken along the line B-B in FIG. 4.

As shown in FIGS. 4 and 5, the warp-knitted fabric 11 is knitted such that the coupling portion 2d of the base 2 has a chain-stitch row 2e as a part of the base 2 knitted therein which is knitted with a knitting yarn different from the coupling yarn 2c, and the chain-stitch rows 2a, 2b, 2e including the chain-stitch row 2e are coupled to other chain-stitch rows 2a, 2b 2e located near them by a plurality of coupling yarns 2c in a wale direction. Note that it does not matter whether the knitting yarn used for the chain-stitch row 2e is colored or colorless; however, using a transparent knitting yarn can easily accentuate the colors of the ridge portion 6.

Figure 6:
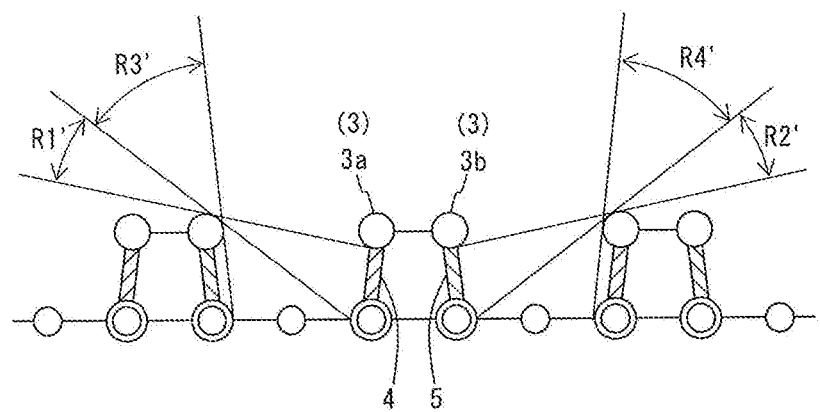
FIG. 6 is an illustration for explaining a color effect of the warp-knitted fabric according to the second embodiment.

In this warp-knitted fabric 11, because the chain-stitch row 2e is additionally knitted in the coupling portion 2d of the base 2, the space between the ridge portions 6 is wider than that of the warp-knitted fabric 1. Therefore, as shown in FIG. 6, the region R1' from which the top portion 3 and the side wall portion 4 are visually recognized and the region R2' from which the top portion 3 and the side wall portion 5 are visually recognized are smaller than the region R1 and the region R2 for the warp-knitted fabric 1, respectively. Meanwhile, the region R3' and the region R4' are larger than the region R3 and the region R4, respectively.

Accordingly, because the region R3' and the region R4' are larger, the warp-knitted fabric 11 exhibits a more brilliant color change.

Note that the number of chain-stitch rows 2e knitted in the coupling portion 2d is not necessarily limited to one and may be two or more. However, making the space between the ridge portions 6 excessively wide could make the region R1' and the region R2' too small to sufficiently exhibit the color effect, or could cause the base 2 to be exposed so much that the beauty of the knitted fabric 11 is impaired. Therefore, it is preferred that the number of chain-stitch rows 2e is determined taking the height h of the ridge portions 6 into account so that the ranges of the region R1' and region R2' are an appropriate value (preferably, approximately not smaller than) 20°, the ranges of the region R3' and region R4' are an appropriate value (preferably, approximately not smaller than 40°), and the space I between the ridge portions 6 is approximately 1.5 mm to 4 mm (which is equivalent to approximately 3 to 5 knitting needles).

Third Embodiment

Next, a warp-knitted fabric 21 according to third embodiment of the present invention is described below with reference to FIG. 7. Note that, similarly to the above description, the same components as those of the warp-knitted fabric 1 are denoted by the same reference signs and detailed description thereof is omitted. Further, FIG. 7 also omits illustration of the chain-stitch rows 2a, 2b of the base 2.

Figure 7:
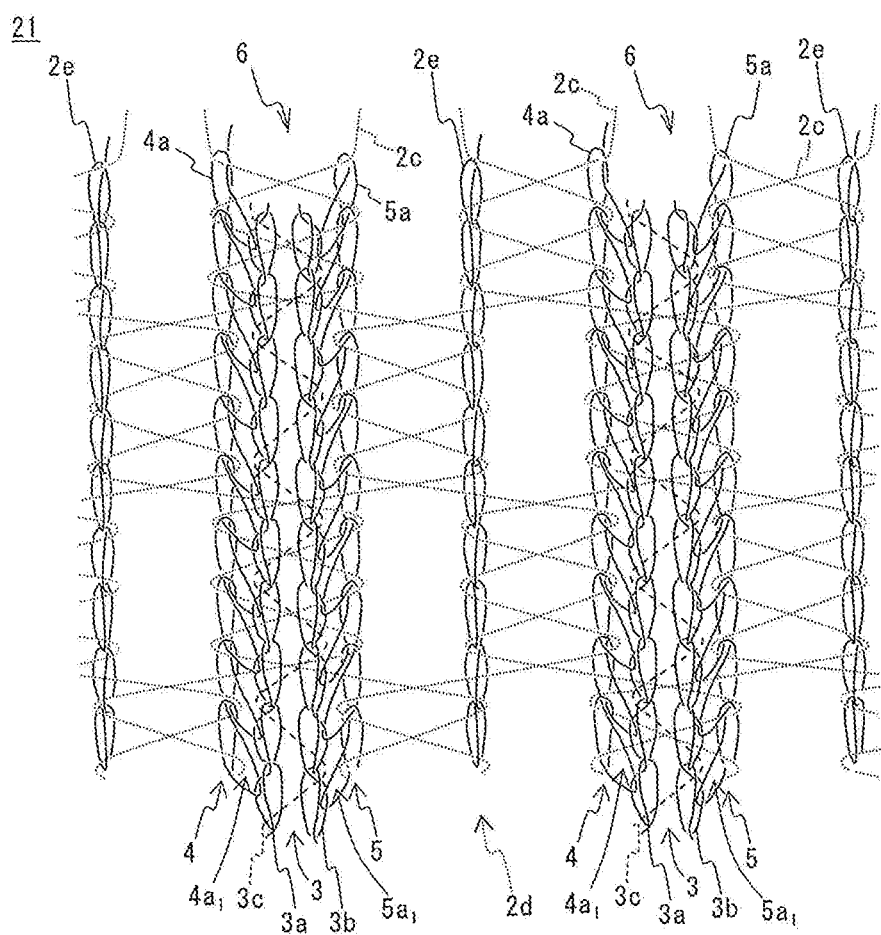
FIG. 7 shows details of a structure of a warp-knitted fabric according to a third embodiment.

As shown in FIG. 7, the warp-knitted fabric 21 according to the third embodiment is knitted such that the coupling portion 2d of the base 2 has a chain-stitch row 2e knitted therein, and parts of the chain-stitch rows 2a, 2b, 2e including the chain-stitch row 2e are coupled to parts of other chain-stitch rows 2a, 2b, 2e located near them by a plurality of coupling yarns 2c in a wale direction so that the coupling portion 2d of the base 2 is formed in a so-called mesh pattern. Note that, in FIG. 7, the chain-stitch row 2e is indicated by solid lines.

Similarly to the warp-knitted fabric 1, this warp-knitted fabric 21 produces a color effect such that the color of the warp-knitted fabric is changed in accordance with the position of the observer who looks at the warp-knitted fabric 21. Further, forming the coupling portion 2d of the base 2 in a mesh pattern enables reduction of the weight of the warp-knitted fabric 21 itself and, when it is used for clothes or the like, the clothes or the like can have high air permeability.

Fourth Embodiment

Next, a warp-knitted fabric 31 according to a fourth embodiment is described below with reference to FIG. 8. Note that, in the following description, similarly to the above descriptions, the same components as those of the warp-knitted fabric 1 are denoted by the same reference signs and detailed description thereof is omitted.

Figure 8:
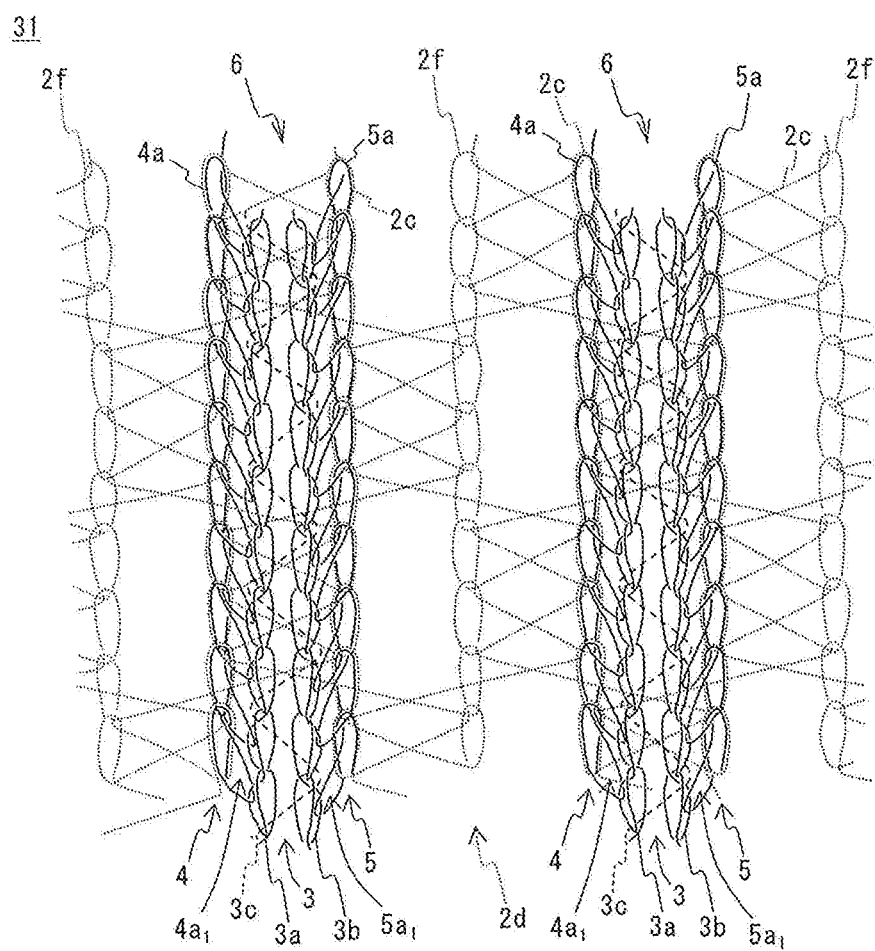
FIG. 8 shows details of a structure of a warp-knitted fabric according to a fourth embodiment.

As shown in FIG. 8, differently from the warp-knitted fabrics 1, 11, 21, in the warp-knitted fabric 31, the coupling portion 2d of the base 2 has a stitch row 2f formed therein which is composed of loops and if formed by the coupling yarn 2c, and the coupling yarn 2c is connected to the chain-stitch rows 4a, 5a of the side wall portions 4, 5, whereby the coupling portion 2d of the base 2 is formed in a mesh pattern.

Similarly to the warp-knitted fabric 21, this warp-knitted fabric 31 also produces a color effect such that the color of the knitted fabric 31 is changed in accordance with the position of the observer who looks at the warp-knitted fabric 31. Further, forming the coupling portion 2d in a mesh pattern enables reduction of the weight of the knitted fabric itself and, when it is used for clothes or the like, the clothes or the like can have high air permeability.

Fifth Embodiment

Next, a warp-knitted fabric 41 according to a fifth embodiment is described below with reference to FIG. 9. Note that, similarly to the above descriptions, the same components as those of the warp-knitted fabric 1 are denoted by the same reference signs and detailed description thereof is omitted. Further, in FIG. 9, illustration of the base 2 is entirely omitted.

Figure 9:
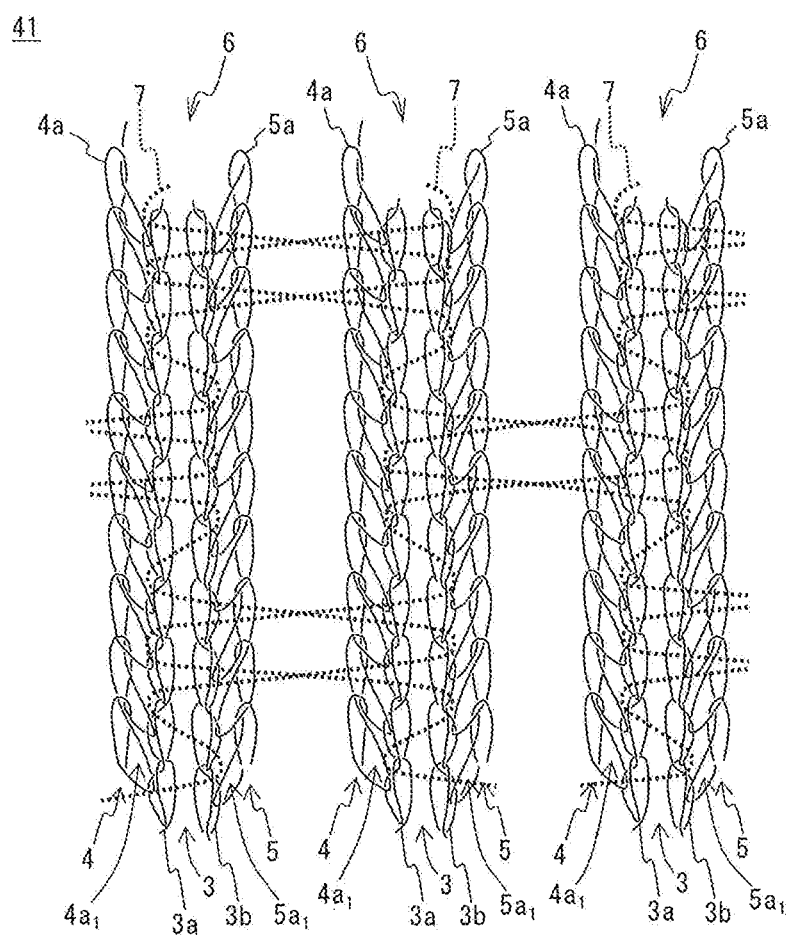
FIG. 9 shows details of a structure of a warp-knitted fabric according to a fifth embodiment.

As shown in FIG. 9, this warp-knitted fabric 41 is knitted such that a part of the top portion 3 of each ridge portion 6 is coupled to parts of the top portions 3 of other ridge portions 6 adjacent thereto by a plurality of coupling yarns 7 so that a mesh-patterned structure is formed in a plane lying almost at the same height as the top portions 3. Note that it is preferred that the coupling yarns 7 are colored yarns. Further, in FIG. 9, the coupling yarns 7 are indicated by dotted lines.

In this warp-knitted fabric 41, because the mesh-patterned structure is formed in a plane lying almost at the same height as the top portions 3, the ridge portions 6 are visually recognized through openings of the mesh pattern by the observer. Therefore, as compared with the case where no mesh-patterned structure is formed, it is possible to express a complicated pattern. Further, because each ridge portion 6 is coupled to other ridge portions 6, the ridge portions 6 can have improved shape stability.

Figure 10:
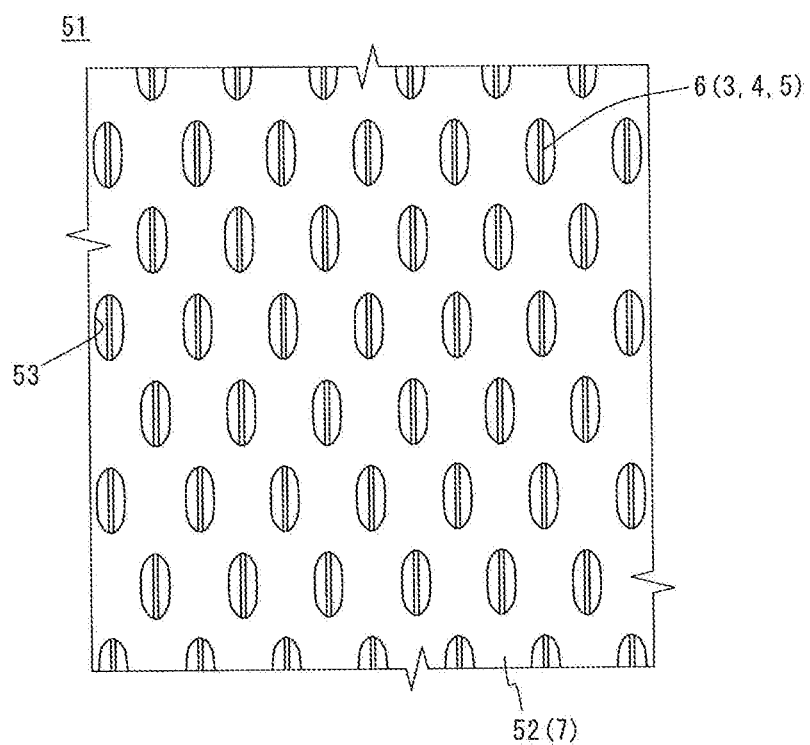
FIG. 10 shows a variation of the warp-knitted fabric according to the fifth embodiment.

Note that this warp-knitted fabric 41 may have a knitted structure having cuts (small openings) formed therein which is formed in a plane lying almost at the same height as the top portions 3 by knitting a wide knitted area with the plurality of knitting yarns 7 that couple the top portions 3 to each other. FIG. 10 illustrates a thus-knitted warp-knitted fabric 51 which is seen from the surface side. In FIG. 10, the reference sign 52 indicates the wide knitted area and the reference sign 53 indicate the cut.

As shown in FIG. 10, on this warp-knitted fabric 51, the wide knitted area 52 knitted with the plurality of coupling yarns 7 is visually recognized by the observer and the top portions 3 and side wall portions 4, 5 of the ridge portions 6 are visually recognized through the cuts 53. Therefore, the warp-knitted fabric 51 has a beautiful appearance different from those of warp-knitted fabrics having no wide knitted area 52 knitted therein, and a complicated pattern appears on the surface of the warp-knitted fabric 51. Further, the appearance of the warp-knitted fabric 51 is changed by changing the color of the coupling yarns 7 or combination of the colors of the knitting yarn for the chain-stitch rows 3a, 3b of the top portion 3 and knitting yarns for the chain-stitch rows 4a, 5a of the side wall portions 4, 5. Therefore, when the warp-knitted fabric 51 is used for clothes or shoes, it is easy to allow the clothes or shoes to have diversity in appearance.

Hereinbefore, several embodiments of the present invention have been described. However, the present invention is not limited thereto and can be implemented in other modes.

For example, in the above embodiments, the chain-stitch rows 3a, 3b constituting the top portion 3 are knitted with a knitting yarn of a first color, the chain-stitch row 4a constituting one side wall portion 4 is knitted with a knitting yarn of a second color, and the chain-stitch row 5a constituting the other side wall portion 5 is knitted with a knitting yarn of a third color, whereby different colors are arranged on the top portion 3 and the side wall portions 4, 5. However, the present invention is not limited thereto and it is enough if any one of the top portion 3 and side wall portions 4, 5 is of a different color from the others of them.

Specifically, the chain-stitch rows 3a, 3b, 4a constituting the top portion 3 and the side wall portion 4 may be knitted with a knitting yarn of a first color, with the chain-stitch row 5a constituting the side wall portion 5 being knitted with a knitting yarn of a second color. In this case, the observer visually recognizes only the first color when looking at the warp-knitted fabric from the side wall portion 4 side, whereas the observer visually recognizes the first and second colors when looking at the warp-knitted fabric from the side wall portion 5 side.

Further, the chain-stitch rows 3a, 3b of the top portion 3 may be knitted with a knitting yarn of a first color, with the chain-stitch rows 4a, 5a of the side wall portions 4, 5 being knitted with a knitting yarn of a second color. In this case, the observer visually recognizes the first and second colors when looking at the warp-knitted fabric from the side wall portion 4 side or the side wall portion 5 side, whereas the observer visually recognizes almost only the first color when looking at the warp-knitted fabric from the front side.

Thus, when any one of the top portion 3 and side wall portions 4, 5 is of a different color from the others of them, it is possible to allow the knitted fabric to exhibit the color effect such that the color of the knitted fabric is changed in accordance with the position of the observer who looks at the knitted fabric from a direction intersecting the knitting direction.

Further, in the above embodiments, the top portion 3 is knitted by coupling the two chain-stitch rows 3a, 3b to each other with the coupling yarn 3c. However, the number of chain-stitch rows constituting the top portion 3 is not limited thereto and the top portion 3 may be knitted by coupling three or more chain-stitch rows to each other with a coupling yarn.

Furthermore, in the above embodiments, the coupling yarn 2c uses a transparent yarn. However, the present invention is not limited thereto and the coupling yarn may use a colored yarn.

REFERENCE SIGNS LIST

1, 11, 21, 31, 41, 51 Warp-knitted fabric
2 Base
2a, 2b Chain-stitch row
2c Coupling yarn
2d Coupling portion
2e Chain-stitch row
2f Stitch row
3 Top portion
3a, 3b Chain-stitch row
3c Coupling yarn
4, 5 Side wall portion
4a, 5a Chain-stitch row
4a$_1$, 5a$_1$ Loop
6 Ridge portion
7 Coupling yarn

The invention claimed is:

1. A knitted fabric having a base and a plurality of ridge portions formed in parallel to each other along a knitting direction on the base, characterized in that:
   each of the ridge portions comprises a top portion and two side wall portions, the top portion being formed by a stitch row extending in the knitting direction, each of the two side wall portions being formed by a stitch row extending in the knitting direction and knitted such that it is knitted in the base at the base side thereof and engaged with the top portion at the top portion side thereof to couple the top portion to the base;
   at least one of the top portion and two side wall portions has a different color arranged thereon from the others of the top portion and two side wall portions;
   the top portion is formed by at least two chain-stitch rows and has a structure in which the at least two chain-stitch rows are coupled to each other by a coupling yarn;
   each of the two side wall portions is formed by a chain-stitch row identical to the chain-stitch rows of the top portion;
   the chain-stitch rows of the side wall portions are engaged with the top portion in a state where loops formed on the top portion sides thereof are inserted in the chain-stitch rows of the top portion, and are connected at the base sides thereof to the base; and
   the knitted fabric has a structure in which positions connected to the base of adjacent side wall portions between the ridge portions adjacent to each other are spaced a predetermined distance from each other.

2. The knitted fabric according to claim 1, characterized in that the coupling yarn is extended between a part of the top portion of each of the ridge portions and parts of the top portions of other ridge portions adjacent thereto to form a mesh portion.

3. The knitted fabric according to claim 1, characterized in that the knitted fabric has formed thereon a knitted area having at least one cut, the knitted area being knitted to couple a part of the top portion of each of the ridge portions to parts of the top portions of other ridge portions adjacent thereto.

4. The knitted fabric according to claim 1, characterized in that the base has at least one stitch row formed therein between each of the ridge portions and other ridge portions adjacent thereto.

5. The knitted fabric according to claim 1, characterized in that the base is formed in a mesh pattern.

6. The knitted fabric according to claim 1, characterized in that the base is made of a transparent yarn.

7. A fabric knitting method using a knitting machine to knit a knitted fabric having a base and a plurality of ridge portions formed in parallel to each other along a knitting direction on the base, the ridge portions each comprising a top portion and two side wall portions coupling the top portion to the base, the knitting machine comprising at least one pair of needle beds having a plurality of knitting needles and facing each other, and a feed mechanism feeding a knitting yarn to the knitting needles, the method characterized by comprising:

while causing the feed mechanism to feed at least one of knitting needles corresponding to the top portion and the two side wall portions with a knitting yarn of a color different from a color of a knitting yarn to be fed to the others of the knitting needles;

on one of the pair of needle beds, knitting at least two chain-stitch rows and coupling the chain-stitch rows to each other with a coupling yarn to form the top portion; and on another one of the pair of needle beds, knitting chain-stitch rows identical to the chain-stitch rows of the top portion such that loops inserted in the chain-stitch rows constituting the top portion are formed on sides thereof facing the one of the pair of needle beds to form the two side wall portions coupled to the top portion, and forming the base such that the two side wall portions are connected to the base and positions connected to the base of adjacent side wall portions between the ridge portions adjacent to each other are spaced a predetermined distance from each other.

8. The fabric knitting method according to claim 7, characterized by extending the coupling yarn between a part of the top portion of each of the ridge portions and parts of the top portions of other ridge portions adjacent thereto to form a mesh portion.

9. The fabric knitting method according to claim 7, characterized by forming a knitted area having at least one cut, the knitted area being knitted to couple a part of the top portion of each of the ridge portions to parts of the top portions of other ridge portions adjacent thereto.

10. The fabric knitting method according to claim 7, characterized by forming at least one stitch row between each of the ridge portions and other ridge portions adjacent thereto in the base.

11. The fabric knitting method according to claim 7, characterized by forming the base in a mesh pattern.

12. The fabric knitting method according to claim 7, characterized by causing the feed mechanism to feed a transparent yarn to knitting needles corresponding to the base.

13. The knitted fabric according to claim 1, wherein the base is formed by chain-stitch rows identical to the chain-stitch rows of the top portion and side wall portion, and has a structure in which the chain-stitch rows adjacent to each other thereof are coupled to each other by a coupling yarn.

14. The fabric knitting method according to claim 7, wherein the base is formed by knitting chain-stitch rows identical to the chain-stitch rows of the top portion and side wall portions and coupling between the knitted chain-stitch rows adjacent to each other with a coupling yarn.

* * * * *